United States Patent
Blankenburg et al.

(10) Patent No.: US 10,590,045 B2
(45) Date of Patent: Mar. 17, 2020

(54) LIQUID FERTILIZER

(71) Applicants: Dean Blankenburg, West Bend, WI (US); Eric M. Johnson, West Allis, WI (US); Nathan Ludtke, Waterford, WI (US)

(72) Inventors: Dean Blankenburg, West Bend, WI (US); Eric M. Johnson, West Allis, WI (US); Nathan Ludtke, Waterford, WI (US)

(73) Assignee: HYDRITE CHEMICAL CO., Brookfield, WI (US)

( * ) Notice: Subject to any disclaimer, the term of this patent is extended or adjusted under 35 U.S.C. 154(b) by 0 days.

(21) Appl. No.: 14/880,369

(22) Filed: Oct. 12, 2015

(65) Prior Publication Data

US 2017/0101349 A1  Apr. 13, 2017

(51) Int. Cl.
*C05C 3/00* (2006.01)
*C05G 3/00* (2020.01)
*C05C 1/00* (2006.01)

(52) U.S. Cl.
CPC .............. *C05C 3/00* (2013.01); *C05C 1/00* (2013.01); *C05G 3/0076* (2013.01)

(58) Field of Classification Search
CPC .... C05C 3/00; C05C 1/00; C05C 9/00; C05G 3/0076; C05G 3/0005; C05B 17/00
See application file for complete search history.

(56) References Cited

U.S. PATENT DOCUMENTS

| | | | |
|---|---|---|---|
| 4,210,437 A * | 7/1980 | Windgassen | C05C 3/00 423/514 |
| 4,239,522 A | 12/1980 | Wilson et al. | |
| 4,581,056 A * | 4/1986 | Nooden | C05F 11/10 504/136 |
| 5,082,487 A | 1/1992 | Mayer | |
| 5,199,967 A * | 4/1993 | Young | C05B 7/00 504/103 |
| 5,539,141 A * | 7/1996 | Dorn | C05B 17/00 558/72 |
| 8,137,430 B2 | 3/2012 | Armbrust et al. | |
| 8,888,886 B1 | 11/2014 | Whitehurst et al. | |
| 2004/0035162 A1* | 2/2004 | Williams | C05B 17/00 71/28 |
| 2014/0037570 A1* | 2/2014 | Whitehurst | C05G 3/08 424/76.6 |
| 2016/0200636 A1* | 7/2016 | Roach | C05F 11/08 71/6 |

FOREIGN PATENT DOCUMENTS

WO   2014039379 A1   3/2014
WO   2014095785 A1   6/2014

OTHER PUBLICATIONS

Sekhon, B. S. "Chelates for micronutrient nutrition among crops." Resonance 8.7 (2003): 46-53.*

* cited by examiner

*Primary Examiner* — Jennifer A Smith
(74) *Attorney, Agent, or Firm* — Quarles & Brady LLP

(57) ABSTRACT

Disclosed is a liquid fertilizer including: (i) an aqueous composition including ammonium thiosulfate; and (ii) a complex of a metal ion and a chelating agent, wherein the metal ion is selected from the group consisting of zinc, manganese, copper, iron, magnesium, calcium, potassium, and molybdenum. The complex lowers the freeze point of the aqueous composition when creating a liquid fertilizer including the ammonium thiosulfate and the complex. Optionally, the liquid fertilizer includes borate ions. Methods of using the liquid fertilizer are also disclosed.

20 Claims, No Drawings

LIQUID FERTILIZER

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The invention relates to fertilizer compositions comprising an aqueous composition including ammonium thiosulfate; and a complex of a metal ion and a chelating agent, wherein the complex lowers the freeze point of the aqueous composition when creating a liquid fertilizer including the ammonium thiosulfate and the complex. Optionally, the liquid fertilizer includes borate ions. Methods of using the liquid fertilizer are also disclosed.

2. Description of the Related Art

Various elements, which are normally drawn from the soil, are known to be essential to plant nutrition. These elements include: nitrogen (N), phosphorus (P), potassium (K), sulfur (S), calcium (Ca), magnesium (Mg), iron (Fe), manganese (Mn), copper (Cu), zinc (Zn), boron (B), molybdenum (Mo), and chlorine (Cl). Of these elements, nitrogen, phosphorus, potassium, sulfur, calcium, and magnesium are needed by plants in relatively large quantities and are therefore called macronutrients. The remaining members of the group (iron, manganese, copper, zinc, boron, molybdenum, and chlorine) are known as micronutrients since they are required in very small amounts for plant growth.

Ammonium thiosulfate (ATS, 12-0-0-26, N-P-K-S) is emerging as a key nutrient product for corn cultivation. Along with providing both high levels of elemental nitrogen and sulfur in an easy and safe to handle aqueous liquid form, ATS also provides some level of urease inhibition. Another key property of ATS is that when combined with a urea-ammonium nitrate (UAN) solution at a 1:10 ratio, ATS lowers the freeze point (salt out temperature) of UAN from roughly 32° F. to 0° F. Lowering the salt out temperature has a tremendous advantage for storing the product over cold winter months as dealers/suppliers can eliminate or reduce costly heating systems and storage equipment. ATS can be added to a UAN solution in solid form or as an aqueous solution.

While aqueous solutions of ammonium thiosulfate are beneficial as a liquid fertilizer and as a liquid freezing point depressant for UAN solutions, aqueous solutions of ammonium thiosulfate do have certain disadvantages. One major disadvantage of aqueous solutions of ammonium thiosulfate is that they are temperature sensitive in that they begin to crystallize out of solution as the solution temperature decreases. Crystallization causes problems such as plugging of lines, applicator nozzles, storage tanks, etc., as well as reducing the nutrient value of a fertilizer that includes the aqueous ammonium thiosulfate. Consequently, liquid fertilizers have been limited to use and storage where the ambient temperature is above the crystallization temperature of the liquid fertilizer.

Thus, there is a need for stable liquid fertilizer compositions that include ammonium thiosulfate (which provides advantageous levels of the macronutrients nitrogen and sulfur) and plant nutrients (such as other macronutrients and/or micronutrients), and that will not crystallize during cold temperatures, particularly sub-zero temperatures.

SUMMARY OF THE INVENTION

The present disclosure addresses the foregoing needs by providing liquid fertilizers including plant nutrients and also having stability at low temperatures in a geographic location in which the fertilizer is used, transported, and/or stored.

One embodiment of the invention is a liquid fertilizer comprising: (i) an aqueous composition including ammonium thiosulfate; and (ii) a complex of a metal ion and a chelating agent, wherein the metal ion is selected from the group consisting of zinc, manganese, copper, iron, magnesium, calcium, potassium, and molybdenum. The aqueous composition has a first freeze point, and the fertilizer has a second freeze point that is lower than the first freeze point. Thus, the complex lowers the freeze point of the aqueous composition when creating a liquid fertilizer including the ammonium thiosulfate and the complex.

Another embodiment of the invention is a liquid fertilizer comprising: (i) an aqueous composition including ammonium thiosulfate wherein the composition has a first freeze point; (ii) a complex of a metal ion and a chelating agent, wherein the metal ion is selected from the group consisting of zinc, manganese, copper, iron, magnesium, calcium, potassium, and molybdenum; and (iii) borate ions, wherein the fertilizer has a second freeze point that is lower than the first freeze point. Thus, the complex lowers the freeze point of the aqueous composition when creating a liquid fertilizer including the ammonium thiosulfate and the complex.

The invention also provides a method for fertilizing soil including the step of applying to the soil an amount of a fertilizer in accordance with any of the embodiments of the invention, wherein the amount is effective to improve plant growth.

The invention provides another method for fertilizing soil including the steps of: (i) adding a fertilizer in accordance with any of the embodiments of the invention to a urea-ammonium nitrate solution to create a second liquid fertilizer; and (ii) applying to the soil an amount of the second fertilizer, the amount being effective to improve plant growth.

These and other features, aspects, and advantages of the present invention will become better understood upon consideration of the following detailed description and appended claims.

DETAILED DESCRIPTION OF THE INVENTION

The compositions and methods of the present disclosure provide fertilizers and methods of using a fertilizer. As used herein, fertilizer means any material of natural or synthetic origin that is added to a soil to supply one or more plant nutrients essential to the growth of plants. A fertilizer may provide one or more of the following plant nutrients: nitrogen (N), phosphorus (P), potassium (K), sulfur (S), calcium (Ca), magnesium (Mg), iron (Fe), manganese (Mn), copper (Cu), zinc (Zn), boron (B), molybdenum (Mo), and chlorine (Cl), in elemental form or as an ion of the element.

One non-limiting embodiment of the invention is a stable liquid fertilizer comprising: (i) an aqueous composition including ammonium thiosulfate; and (ii) a complex of a metal ion and a chelating agent, wherein the metal ion is selected from the group consisting of zinc, manganese, copper, iron, magnesium, calcium, potassium, and molybdenum. The aqueous composition has a first freeze point, and the fertilizer has a second freeze point that is lower than the first freeze point. By stable, we mean the fertilizer does not undergo phase separation at an ambient temperature in which the fertilizer is used, transported, and/or stored.

Ammonium thiosulfate can be conveniently handled as a concentrated aqueous solution and is compatible with many liquid fertilizer solutions. It is compatible with neutral phosphates, aqueous ammonia, nitrogen solutions containing ammonium nitrate, urea solutions, urea-ammonium nitrate solutions, and most nitrogen, nitrogen-phosphorus, or complete fertilizer solutions.

The complex of the liquid fertilizer can be formed by mixing a chelating agent with a solution of a metal ion. The chelating agent can be selected from aminocarboxylic acids, heterocyclic carboxylic acids, polycarboxylic acids, monocarboxylic acids, phosphonic acids, and mixtures and salts thereof. The chelating agent can be selected from carboxylic acids, and mixtures and salts thereof. The chelating agent can be selected from aminocarboxylic acids, and mixtures and salts thereof. Certain complexes are commercially available.

For the chelating agent, suitable aminocarboxylic acids can include, without limitation, ethylenediaminetetraacetic acid (EDTA); hydroxyethyleneiminodiacetic acid (HEIDA); nitrilotriacetic acid (NTA); N-(2-hydroxyethyl)ethylenediamine-N,N',N'-triacetic acid (HEDTA); N-carboxymethyliminobis(ethylenenitrilo) tetraacetic acid (DTPA); ethylene glycol-bis(2-aminoethylether)-N,N,N',N'-tetraacetic acid (EGTA); ethylenediamine-N,N'-bis(2-hydroxyphenylacetic acid) (EDDHA); N-(2-hydroxyethyl)ethylenediamine-N,N',N'-triacetic acid (HDDTA); ethylenediamine-N,N'-bis(2-hydroxy-6-methylphenylacetic acid) (EDDHMA); ethylenediamine-N,N'-bis(2-carboxy-5-hydroxyphenylacetic acid) (EDDCHA); ethylenediamine-N,N'-bis(2-hydroxy-5-sulfophenylacetic acid) (EDDHSA); methylglycinediacetic acid (MGDA); glutamic acid diacetic acid (GLDA); imidodiacetic acid; ethylenediaminetriacetic acid; and/or diethylenetriaminepentaacetic acid.

For the chelating agent, suitable heterocyclic carboxylic acids can include, without limitation, picolinic acid (pyridine-2-carboxylic acid).

For the chelating agent, suitable polycarboxylic acids and monocarboxylic acids can include, without limitation, gluconic acid (2,3,4,5,6-pentahydroxycaproic acid); citric acid (2-hydroxy-1,2,3-propanetricarboxylic acid); malonic acid (propanedioic acid); oxalic acid (ethanedioic acid); ascorbic acid ((R)-3,4-dihydroxy-5-((S)-1,2-dihydroxyethyl)furan-2 (5H)-one); acetic acid (ethanoic acid); and/or tartaric acid (2,3-dihydroxybutanedioic acid).

For the chelating agent, suitable phosphonic acids can include, without limitation, amino trimethylene phosphonic acid; hydroxyethylidene 1,1-diphosphonic acid; hexamethylenediamine tetra(methylene phosphonic) acid; diethylenetriamine penta(methylene phosphonic) acid; bis-hexamethylenetriamine penta(methylene phosphonic) acid; and/or phosphonobutane tricarboxylic acid.

Preferred chelating agents are selected from ethylenediaminetetraacetic acid; hydroxyethyleneiminodiacetic acid; nitrilotriacetic acid; N-(2-hydroxyethyl)ethylenediamine-N, N',N'-triacetic acid; N-carboxymethyliminobis(ethylenenitrilo) tetraacetic acid; ethylene glycol-bis(2-aminoethylether)-N,N,N',N'-tetraacetic acid; ethylenediamine-N,N'-bis (2-hydroxyphenylacetic acid); N-(2-hydroxyethyl) ethylenediamine-N,N',N'-triacetic acid; ethylenediamine-N, N'-bis(2-hydroxy-6-methylphenylacetic acid); ethylenediamine-N,N'-bis(2-carboxy-5-hydroxyphenylacetic acid)); ethylenediamine-N,N'-bis(2-hydroxy-5-sulfophenylacetic acid); methylglycinediacetic acid; glutamic acid diacetic acid; imidodiacetic acid; ethylenediaminetriacetic acid; diethylenetriaminepentaacetic acid; and salts thereof.

The metal ion of the complex can be selected from the group consisting of zinc, manganese, copper, iron, magnesium, and calcium. In one version of the complex, the metal ion is selected from the group consisting of zinc, manganese, copper, iron, magnesium, and calcium, and the chelating agent is ethylenediaminetetraacetic acid.

In the fertilizer, the aqueous composition can have a first freeze point in a range of 31° F. to 45° F., or in a range of 31° F. to 33° F., or in a range of 40° F. to 45° F. The fertilizer can have a second freeze point of less than or equal to 30° F., or less than or equal to 20° F., or less than or equal to 10° F., or less than or equal to 0° F.

In one version of the fertilizer, the aqueous composition includes ammonium thiosulfate in a range of 20 weight % to 80 weight %, or in a range of 40 weight % to 80 weight %, or in a range of 50 weight % to 70 weight %, or in a range of 55 weight % to 65 weight %, the weight % of the ammonium thiosulfate being based on percent by weight of the total aqueous composition.

In one version of the fertilizer, the metal ion is present in the fertilizer in a range of 0.01 weight % to 10 weight %, or in a range of 0.01 weight % to 5 weight %, or in a range of 0.1 weight % to 3 weight %, or in a range of 0.1 weight % to 1 weight %, the weight % of the metal ion being based on percent by weight of the total fertilizer.

The fertilizer may include borate ions. In one version of the fertilizer, the borate ions are present in the fertilizer in a range of 0.01 weight % to 10 weight %, or in a range of 0.01 weight % to 5 weight %, or in a range of 0.1 weight % to 3 weight %, or in a range of 0.1 weight % to 1 weight %, the weight % of the borate ions being based on percent by weight of the total fertilizer. The borate ions can be provided in the fertilizer by adding a water soluble compound that yields borate ions in solution, such as, without limitation, boric acid, calcium metaborate, sodium metaborate, potassium metaborate, potassium tetraborate, sodium tetraborate, sodium metaborate tetrahydrate, disodium octaborate tetrahydrate (marketed commercially as Solubor®), sodium tetraborate decahydrate (marketed commercially as Borax), and the like. Borate ions can be written as $[B_4O_5(OH)_4]^{2-}$.

In one version of the fertilizer, the aqueous composition includes urea and ammonium nitrate. The aqueous composition can be prepared by mixing ammonium thiosulfate and a urea-ammonium nitrate solution. The ammonium thiosulfate can be mixed with the urea-ammonium nitrate solution at a ratio of 1 part by weight of the ammonium thiosulfate to 5-15 parts by weight of the urea-ammonium nitrate solution. The urea-ammonium nitrate solution may have a weight ratio of urea:ammonium nitrate of about 1:1 to 1:2, or about 1:1.2 to 1:1.5. The urea-ammonium nitrate solution may contain 26% Nitrogen (total) to 32% Nitrogen (total).

In one version of the fertilizer, the fertilizer includes one or more additional complexes that each comprise a metal ion and a chelating agent selected from the metal ions (e.g., zinc, manganese, copper, iron, magnesium, and calcium) and chelating agents (e.g., aminocarboxylic acids, heterocyclic carboxylic acids, polycarboxylic acids, monocarboxylic acids, phosphonic acids) described above. The one or more additional complexes can provide a total metal ion level in the fertilizer in a range of 0.01 weight % to 10 weight %, or in a range of 0.01 weight % to 5 weight %, or in a range of 0.1 weight % to 3 weight %, or in a range of 0.1 weight % to 1 weight %, the weight % of the total metal ions are based on percent by weight of the total fertilizer.

Another non-limiting embodiment of the invention is a stable liquid fertilizer comprising: (i) an aqueous composition including ammonium thiosulfate wherein the composition has a first freeze point; (ii) a complex of a metal ion and a chelating agent, wherein the metal ion is selected from the group consisting of zinc, manganese, copper, iron, magnesium, calcium, potassium, and molybdenum; and (iii) borate ions, wherein the fertilizer has a second freeze point that is lower than the first freeze point. Thus, the complex lowers the freeze point of the aqueous composition when creating a liquid fertilizer including the ammonium thiosulfate and the complex. The metal ion and chelating agent may be any of the metal ions (e.g., zinc, manganese, copper, iron, magnesium, and calcium) and chelating agents (e.g., aminocarboxylic acids, heterocyclic carboxylic acids, polycarboxylic acids, monocarboxylic acids, phosphonic acids) described above.

In this embodiment of the invention, the borate ions can be present in the fertilizer in a range of 0.01 weight % to 10 weight %, or in a range of 0.01 weight % to 5 weight %, or in a range of 0.1 weight % to 3 weight %, or in a range of 0.1 weight to 1 weight %, the weight % of the borate ions being based on percent by weight of the total fertilizer. The borate ions can be provided in the fertilizer by adding a water soluble compound that yields borate ions in solution, such as, without limitation, boric acid, calcium metaborate, sodium metaborate, potassium metaborate, potassium tetraborate, sodium tetraborate, sodium metaborate tetrahydrate, disodium octaborate tetrahydrate (marketed commercially as Solubor®), sodium tetraborate decahydrate (marketed commercially as Borax), and the like.

In this embodiment of the invention, the metal ion can be present in the fertilizer in a range of 0.01 weight % to 10 weight %, or in a range of 0.01 weight % to 5 weight %, or in a range of 0.1 weight % to 3 weight %, or in a range of 0.1 weight to 1 weight %, the weight % of the metal ion being based on percent by weight of the total fertilizer.

In one version of this embodiment of the invention, the metal ion can be selected from the group consisting of zinc, manganese, copper, iron, magnesium, and calcium, and the chelating agent is ethylenediaminetetraacetic acid. Preferably, the metal ion is zinc, and the chelating agent is ethylenediaminetetraacetic acid.

In one version of this embodiment of the invention, the aqueous composition includes urea and ammonium nitrate. The aqueous composition can be prepared by mixing ammonium thiosulfate and a urea-ammonium nitrate solution. The ammonium thiosulfate may be mixed with the urea-ammonium nitrate solution at a ratio of 1 part by weight of the ammonium thiosulfate to 5-15 parts by weight of the urea-ammonium nitrate solution. The urea-ammonium nitrate solution may have a weight ratio of urea:ammonium nitrate of about 1:1 to 1:2, or about 1:1.2 to 1:1.5. The urea-ammonium nitrate solution may contain 26% Nitrogen (total) to 32% Nitrogen (total).

The invention provides a method for fertilizing soil including the step of applying to the soil an amount of a fertilizer in accordance with any of the embodiments of the invention above, wherein the amount is effective to improve plant growth.

The invention provides another method for fertilizing soil including the steps of: (i) adding a fertilizer in accordance with any of the embodiments of the invention above to a urea-ammonium nitrate solution to create a second liquid fertilizer; and (ii) applying to the soil an amount of the second fertilizer, the amount being effective to improve plant growth.

In another non-limiting embodiment, the invention provides a method for the application of a blended product comprising ammonium thiosulfate, zinc EDTA, and borate ions from a borate salt simultaneously for corn and/or other crops as a single product or combined with a urea-ammonium nitrate solution. There are instances when growers may choose not to apply fertilizers containing phosphorous or potassium either because of cost or the soil already has sufficient levels of those nutrients. In these instances, the more critical nutrients nitrogen and sulfur would still need to be applied to provide the adequate conditions to prompt proper growth and development. A fertilizer of the invention allows for the application of high levels of nitrogen and sulfur, in conjunction with the micronutrients, such as zinc and boron, to be applied in a single application without the risk of nutrient lose because of material incompatibility.

A liquid fertilizer of the invention may include other additives such as adjuvants, antifoam agents, antimicrobial agents, buffering agents, corrosion inhibitors, defoaming agents, deposition agents, dyes, penetration aids, spray drift control agents, spreading agents, stabilizers, sticking agents, suspension aids, viscosity-modifying additives, wetting agents and the like.

Conventional equipment can be used for the application of the liquid fertilizer of this invention. Application is ordinarily accomplished by spraying, although the liquid fertilizer of this invention can also be applied to the soil by mixing into irrigation water.

EXAMPLES

The following Examples has been presented in order to further illustrate the invention and are not intended to limit the invention in any way.

The freeze point is the temperature at which solid crystals disappear when the temperature of a sample rises after having been previously cooled and allowed to form under prescribed test method conditions. During a freeze point test, an analyzer using the ASTM D6660 test method cools the sample relatively quickly until crystals begin to form. After a sufficient number of crystals are present, the sample is warmed until they all disappear. The freeze point reported in the Tables below was determined using this method.

In the present specification, both wt % and Wt % mean weight percent.

Example 1

An aqueous solution of 60 wt % ammonium thiosulfate and 40 wt % water was prepared. The freeze point of this solution is reported in Table 1 below.

TABLE 1

| | Wt % of ammonium thiosulfate | Freeze Point (F. °) |
|---|---|---|
| ATS 60 = an aqueous solution of 60 wt. % ammonium thiosulfate and 40 wt % water | 60 | 31 |

Example 2

A complex of ethylenediaminetetraacetic acid and a zinc cation with zinc at 9 wt % (9% Zn-EDTA) was added at various levels to a quantity sufficient of an aqueous solution of 60 wt % ammonium thiosulfate and 40 wt % water (ATS 60) to equate 100 wt %. The freeze points of the formulations are reported in Table 2 below.

TABLE 2

|  | Wt % Added | Wt % of Zn Ions in Solution | Freeze Point (F. °) |
|---|---|---|---|
| Formulation 2-1 | | | |
| 9% Zn-EDTA | 33.33 | 3.0 | −21 |
| ATS 60 | 66.66 | | |
| Formulation 2-2 | | | |
| 9% Zn-EDTA | 11.11 | 1.0 | 19.4 |
| ATS 60 | 88.89 | | |
| Formulation 2-3 | | | |
| 9% Zn-EDTA | 5.56 | 0.5 | 26.5 |
| ATS 60 | 94.44 | | |
| Formulation 2-4 | | | |
| 9% Zn-EDTA | 1.11 | 0.1 | 29.5 |
| ATS 60 | 98.89 | | |
| Formulation 2-5 | | | |
| 9% Zn-EDTA | 0.56 | 0.05 | 30 |
| ATS 60 | 99.44 | | |

Example 3

A complex of ethylenediaminetetraacetic acid and a manganese cation with manganese at 6 wt % (6% Mn-EDTA) was added at various levels to a quantity sufficient of an aqueous solution of 60 wt % ammonium thiosulfate and 40 wt % water (ATS 60) to equate 100 wt %. The freeze points of the formulations are reported in Table 3 below.

TABLE 3

|  | Wt % Added | Wt % of Mn Ions in Solution | Freeze Point (F. °) |
|---|---|---|---|
| Formulation 3-1 | | | |
| 6% Mn-EDTA | 50.00 | 3.0 | Not Stable |
| ATS 60 | 50.00 | | |
| Formulation 3-2 | | | |
| 6% Mn-EDTA | 16.67 | 1.0 | Not Stable |
| ATS 60 | 83.33 | | |
| Formulation 3-3 | | | |
| 6% Mn-EDTA | 8.33 | 0.50 | Not Stable |
| ATS 60 | 91.67 | | |
| Formulation 3-4 | | | |
| 6% Mn-EDTA | 1.67 | 0.10 | 29.7 |
| ATS 60 | 98.33 | | |
| Formulation 3-5 | | | |
| 6% Mn-EDTA | 0.83 | 0.50 | 30.3 |
| ATS 60 | 99.17 | | |

Example 4

A complex of ethylenediaminetetraacetic acid and a copper cation with copper at 7.5 wt % (7.5% Cu-EDTA) was added at various levels a quantity sufficient of an aqueous solution of 60 wt % ammonium thiosulfate and 40 wt % water (ATS 60) to equate 100 wt %. The freeze points of the formulations are reported in Table 4 below.

TABLE 4

|  | Wt % Added | Wt % of Cu Ions in Solution | Freeze Point (F. °) |
|---|---|---|---|
| Formulation 4-1 | | | |
| 7.5% Cu-EDTA | 40.00 | 3.0 | −30.4 |
| ATS 60 | 100 | | |
| Formulation 4-2 | | | |
| 7.5% Cu-EDTA | 13.33 | 1.0 | 20 |
| ATS 60 | 100 | | |
| Formulation 4-3 | | | |
| 7.5% Cu-EDTA | 6.67 | 0.50 | 26 |
| ATS 60 | 100 | | |
| Formulation 4-4 | | | |
| 7.5% Cu-EDTA | 1.33 | 0.10 | 28.5 |
| ATS 60 | 100 | | |
| Formulation 4-5 | | | |
| 7.5% Cu-EDTA | 0.67 | 0.05 | 29.8 |
| ATS 60 | 100 | | |

Example 5

A complex of ethylenediaminetetraacetic acid and an iron cation with iron at 4.5 wt % (4.5% Fe-EDTA) was added at various levels to a quantity sufficient of an aqueous solution of 60 wt % ammonium thiosulfate and 40 wt % water (ATS 60) to equate 100 wt %. The freeze points of the formulations are reported in Table 5 below.

TABLE 5

|  | Wt % Added | Wt % of Fe Ions in Solution | Freeze Point (F. °) |
|---|---|---|---|
| Formulation 5-1 | | | |
| 4.5% Fe-EDTA | 66.67 | 3.0 | −13.0 |
| ATS 60 | 33.33 | | |
| Formulation 5-2 | | | |
| 4.5% Fe-EDTA | 22.22 | 1.0 | −4.5 |
| ATS 60 | 77.78 | | |
| Formulation 5-3 | | | |
| 4.5% Fe-EDTA | 11.11 | 0.50 | 15.6 |
| ATS 60 | 88.89 | | |
| Formulation 5-4 | | | |
| 4.5% Fe-EDTA | 2.22 | 0.10 | 27.8 |
| ATS 60 | 97.78 | | |
| Formulation 5-5 | | | |
| 4.5% Fe-EDTA | 1.11 | 0.05 | 29.8 |
| ATS 60 | 98.89 | | |

Example 6

A solution comprised of monoethanolamine, water and boric acid (Boron 10%) was added at various levels to a quantity sufficient of an aqueous solution of 60 wt % ammonium thiosulfate and 40 wt % water (ATS 60) to equate 100 wt %. The freeze points of the formulations are reported in Table 6 below.

TABLE 6

| | Wt % Added | Wt % of Borate Ions in Solution | Freeze Point (F. °) |
|---|---|---|---|
| Formulation 6-1 | | | |
| Boron 10% | 10.00 | 4.42 | 20.4 |
| ATS 60 | 90.00 | | |
| Formulation 6-2 | | | |
| Boron 10% | 5.00 | 2.21 | 24.4 |
| ATS 60 | 95.00 | | |
| Formulation 6-3 | | | |
| Boron 10% | 1.00 | 0.44 | 29.7 |
| ATS 60 | 99.00 | | |
| Formulation 6-4 | | | |
| Boron 10% | 0.50 | 0.22 | 30.5 |
| ATS 60 | 99.50 | | |
| Formulation 6-5 | | | |
| Boron 10% | 0.25 | 0.11 | 30.8 |
| ATS 60 | 99.75 | | |

Example 7

A complex of ethylenediaminetetraacetic acid and a magnesium cation with magnesium at 2.5 wt % (2.5% Mg-EDTA) was added at various levels to a quantity sufficient of an aqueous solution of 60 wt % ammonium thiosulfate and 40 wt % water (ATS 60) to equate 100 wt %. The freeze point of the formulations are reported in Table 7 below.

TABLE 7

| | Wt % Added | Wt % of Mg Ions in Solution | Freeze Point (F. °) |
|---|---|---|---|
| 2.5% Mg-EDTA | 2.50 | 0.06 | 27.8 |
| ATS 60 | 97.50 | | |

Example 8

A complex of ethylenediaminetetraacetic acid and a calcium cation with calcium at 3 wt % (3% Ca-EDTA) was added at various levels to a quantity sufficient of an aqueous solution of 60 wt % ammonium thiosulfate and 40 wt % water (ATS 60) to equate 100 wt %. The freeze point of the formulations are reported in Table 8 below.

TABLE 8

| | Wt % Added | Wt % of Ca Ions in Solution | Freeze Point (F. °) |
|---|---|---|---|
| 3% Ca-EDTA | 1.60 | 0.05 | 28.2 |
| ATS 60 | 98.40 | | |

Example 9

A solution of potassium hydroxide (KOH 50 wt %) was added to a quantity sufficient of an aqueous solution of 60 wt % ammonium thiosulfate and 40 wt % water (ATS 60) to equate 100 wt %. The freeze point of the formulation is reported in Table 9 below.

TABLE 9

| | Wt % Added | Wt % of K Ions in Solution | Freeze Point (F. °) |
|---|---|---|---|
| KOH 50% | 0.25 | 0.174 | 30.8 |
| ATS 60 | 99.75 | | |

Example 10

A solution of potassium thiosulfate (KTS 50 wt %) was added at various levels to a quantity sufficient of an aqueous solution of 60 wt % ammonium thiosulfate and 40 wt % water (ATS 60) to equate 100 wt %. The freeze point of the formulations are reported in Table 10 below.

TABLE 10

| | Wt % Added | Wt % of K Ions in Solution | Freeze Point (F. °) |
|---|---|---|---|
| Formulation 10-1 | | | |
| KTS 50 | 50.00 | 20.5 | 0.7 |
| ATS 60 | 50.00 | | |
| Formulation 10-2 | | | |
| KTS 50 | 40.00 | 16.4 | 9.7 |
| ATS 60 | 60.00 | | |
| Formulation 10-3 | | | |
| KTS 50 | 30.00 | 12.3 | 17.8 |
| ATS 60 | 70.00 | | |
| Formulation 10-4 | | | |
| KTS 50 | 20.00 | 8.22 | 23 |
| ATS 60 | 80.00 | | |
| Formulation 10-5 | | | |
| KTS 50 | 10.00 | 4.11 | 42.6 |
| ATS 60 | 90.00 | | |

Example 11

A solution of potassium acetate (KOAc 60 wt %) was added at various levels to a quantity sufficient of an aqueous solution of 60 wt % ammonium thiosulfate and 40 wt % water (ATS 60) to equate 100 wt %. The freeze point of the formulations are reported in Table 11 below.

TABLE 11

| | Wt % Added | Wt % of K Ions in Solution | Freeze Point (F. °) |
|---|---|---|---|
| Formulation 11-1 | | | |
| KOAc | 50.00 | 20.0 | Not Stable |
| ATS 60 | 50.00 | | |
| Formulation 11-2 | | | |
| KOAc | 40.00 | 16.0 | Not Stable |
| ATS 60 | 60.00 | | |
| Formulation 11-3 | | | |
| KOAc | 30.00 | 12.0 | Not Stable |
| ATS 60 | 70.00 | | |
| Formulation 11-4 | | | |
| KOAc | 20.00 | 8.0 | 25.7 |
| ATS 60 | 80.00 | | |
| Formulation 11-5 | | | |

TABLE 11-continued

| | Wt % Added | Wt % of K Ions in Solution | Freeze Point (F. °) |
|---|---|---|---|
| KOAc | 10.00 | 4.0 | 28.8 |
| ATS 60 | 90.00 | | |

Example 12

A complex of ethylenediaminetetraacetic acid and a zinc cation with zinc at 9 wt % (9% Zn-EDTA) and a complex of ethylenediaminetetraacetic acid and an iron cation with iron at 4.5 wt % (4.5% Fe-EDTA) were added at various levels to a quantity sufficient of an aqueous solution of 60 wt % ammonium thiosulfate and 40 wt % water (ATS 60) to equate 100 wt %. The freeze point of the formulations are reported in Table 12 below.

TABLE 12

| | Wt % Added | Wt % Fe Ions and Zn Ions in Solution | Freeze Point (F. °) |
|---|---|---|---|
| Formulation 12-1 | | | |
| 4.5% Fe-EDTA_9% Zn-EDTA | 5.00_5.00 | 0.23 Fe; 0.45 Zn | 23 |
| ATS 60 | 90.00 | | |
| Formulation 12-2 | | | |
| 4.5% Fe-EDTA_9% Zn-EDTA | 1.00_9.00 | 0.05 Fe; 0.81 Zn | 20.7 |
| ATS 60 | 90.00 | | |
| Formulation 12-3 | | | |
| 4.5% Fe-EDTA_9% Zn-EDTA | 1.50_8.50 | 0.07 Fe; 0.77 Zn | 20 |
| ATS 60 | 90.00 | | |

Example 13

A complex of ethylenediaminetetraacetic acid (EDTA) and a zinc cation with zinc at 9 wt % (9% Zn-EDTA) and a solution of boron 10 wt %, as described in example 6, were added at various levels to a quantity sufficient of an aqueous solution of 60 wt % ammonium thiosulfate and 40 wt % water (ATS 60) to equate 100 wt %. The freeze point of the formulations are reported in Table 13 below.

TABLE 13

| | Wt % Added | Wt % of Zn Ions and Borate Ions in Solution | Freeze Point (F. °) |
|---|---|---|---|
| 9% Zn-EDTA_Boron 10% | 9.80_0.20 | 0.88 Zn; 0.88 Borate | 20.5 |
| ATS 60 | 90.00 | | |

Example 14

A complex of ethylenediaminetetraacetic acid and a zinc cation with zinc at 9 wt % (9% Zn-EDTA) and a complex of ethylenediaminetetraacetic acid and an iron cation with iron at 4.5 wt % (4.5% Fe-EDTA) and a solution of boron 10 wt %, as described in example 6, were added at various levels to a quantity sufficient of an aqueous solution of 60 wt % ammonium thiosulfate and 40 wt % water (ATS 60) to equate 100 wt %. The freeze point of the formulations are reported in Table 14 below.

TABLE 14

| | Wt % Added | Wt % of Fe Ions, Zn Ions Borate Ions in Solution | Freeze Point (F. °) |
|---|---|---|---|
| Formulation 14-1 | | | |
| 4.5% Fe-EDTA_9% Zn-EDTA_Boron 10% | 1.80_8.00_0.20 | 0.08 Fe; 0.72 Zn; 0.88 Borate | 24.8 |
| ATS 60 | 90.00 | | |
| Formulation 14-2 | | | |
| 4.5% Fe-EDTA_9% Zn-EDTA_Boron 10% | 0.80_9.00_0.20 | 0.04 Fe; 0.81 Zn; 0.88 Borate | 20.4 |
| ATS 60 | 90.00 | | |
| Formulation 14-3 | | | |
| 4.5% Fe-EDTA_9% Zn-EDTA_Boron 10% | 1.30_8.50_0.20 | 0.06 Fe; 0.77 Zn; 0.88 Borate | 20 |
| ATS 60 | 90.00 | | |

Example 15

A complex of ethylenediaminetetraacetic acid and a zinc cation with zinc at 2 wt % (2% Zn-EDTA) and a complex of ethylenediaminetetraacetic acid and a manganese cation with manganese at 2 wt % (2% Mn-EDTA) and a complex of ethylenediaminetetraacetic acid and a copper cation with copper at 0.5 wt % (0.5% Cu-EDTA) and a complex of ethylenediaminetetraacetic acid and an iron cation with iron at 1 wt % (1% Fe-EDTA) and 0.025% boron (sodium tetraborate decahydrate) were added at various levels to a quantity sufficient of an aqueous solution of 60 wt % ammonium thiosulfate and 40 wt % water (ATS 60) to equate 100 wt %. The freeze point of the formulation is reported in Table 15 below.

TABLE 15

| | Wt % Added | Wt % of Zn Ions, Mn Ions, Cu Ions, Fe Ions, Borate Ions in Solutions | Freeze Point (F. °) |
|---|---|---|---|
| 2% Zn-EDTA_2% Mn-EDTA_0.5% Cu-EDTA_1% Fe_EDTA_0.025% boron | 2.00 | 0.04 Zn; 0.04 Mn; 0.01 Cu; 0.01 Fe; 0.022 borate | 27.9 |
| ATS 60 | 98.00 | | |

Example 16

A commercially available aqueous solution of ammonium thiosulfate was obtained. The freeze point of this solution is reported in Table 16 below. It is believed that the freeze point of this commercially available aqueous solution of ammonium thiosulfate was higher than the freeze point of the aqueous solution of 60 wt % ammonium thiosulfate and 40 wt % water prepared in Example 1 due to impurities present in the commercially available aqueous solution of ammonium thiosulfate.

TABLE 16

|  | Freeze Point (F. °) |
|---|---|
| Commercially Available ATS | 45 |

Example 17

A complex of ethylenediaminetetraacetic acid and a zinc cation with zinc at 2 wt % (2% Zn-EDTA) and a complex of ethylenediaminetetraacetic acid and a manganese cation with manganese at 2 wt % (2% Mn-EDTA) and a complex of ethylenediaminetetraacetic acid and a copper cation with copper at 0.5 wt % (0.5% Cu-EDTA) and a complex of ethylenediaminetetraacetic acid and an iron cation with iron at 1 wt % (1% Fe-EDTA) and 0.025% boron (sodium tetraborate decahydrate) were added at various levels to a quantity sufficient of a commercially available aqueous solution of ammonium thiosulfate of Example 16. The freeze point of this solution is reported in Table 17 below.

TABLE 17

|  | Wt % Added | Wt % of Zn Ions, Mn Ions, Cu Ions, Fe Ions, Borate Ions in Solution | Freeze Point (F. °) |
|---|---|---|---|
| Commercially Available ATS | 98.00 |  | 21 |
| 2% Zn-EDTA_2% Mn-EDTA_0.5% Cu-EDTA_1% Fe_EDTA_0.025% boron | 2.00 | 0.04 Zn; 0.04 Mn; 0.01 Cu; 0.01 Fe; 0.022 borate |  |

Example 18

The addition of chelated zinc (Zn-EDTA) and borax on an analysis basis of 1.0 wt % Zn and 1.0 wt % borate ions reduced the freeze point of a 60% solution of ATS as in Example 1 to below 16.2° F. Additionally, when this solution was blended with a urea-ammonium nitrate solution at a ratio of 1:10, the reduced freeze point of the urea-ammonium nitrate solution was still maintained.

Thus, the invention provides a liquid fertilizer comprising: (i) an aqueous composition including ammonium thiosulfate; and (ii) a complex of a metal ion and a chelating agent, wherein the metal ion is selected from the group consisting of zinc, manganese, copper, iron, magnesium, calcium, potassium, and molybdenum. The complex lowers the freeze point of the aqueous composition when creating a liquid fertilizer including the ammonium thiosulfate and the complex. Optionally, the liquid fertilizer includes borate ions.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A liquid fertilizer comprising:
   an aqueous composition including ammonium thiosulfate, the composition having a first freeze point; and
   a complex of a metal ion and a chelating agent, wherein the metal ion is selected from the group consisting of zinc, manganese, copper, iron, magnesium, calcium, potassium, and molybdenum,
   wherein the fertilizer has a second freeze point that is lower than the first freeze point of the aqueous composition, and
   wherein the aqueous composition includes ammonium thiosulfate in a range of 55 weight % to 80 weight %, the weight % of the ammonium thiosulfate being based on percent by weight of the total aqueous composition, and
   wherein the aqueous composition is present in the fertilizer in a range of 95 weight % to 99 weight %, the weight % of the aqueous composition being based on percent by weight of the total fertilizer, and
   wherein the chelating agent is selected from aminocarboxylic acids, heterocyclic carboxylic acids, polycarboxylic acids, monocarboxylic acids, and mixtures and salts thereof, and
   wherein the liquid fertilizer is stable,
   wherein the liquid fertilizer does not include phosphites.

2. The fertilizer of claim 1 wherein:
   the chelating agent is selected from aminocarboxylic acids, and mixtures and salts thereof.

3. The fertilizer of claim 1 wherein:
   the metal ion is selected from the group consisting of zinc, manganese, copper, iron, magnesium, and calcium.

4. The fertilizer of claim 1 wherein:
   the metal ion is selected from the group consisting of zinc, manganese, copper, iron, magnesium, and calcium, and
   the chelating agent is ethylenediaminetetraacetic acid.

5. The fertilizer of claim 1 wherein:
   the first freeze point of the aqueous composition is in a range of 31° F. to 45° F.

6. The fertilizer of claim 1 wherein:
   the first freeze point of the aqueous composition is in a range of 31° F. to 33° F.

7. The fertilizer of claim 1 wherein:
   the second freeze point of the fertilizer is less than or equal to 30° F.

8. The fertilizer of claim 1 wherein:
   the second freeze point of the fertilizer is less than or equal to 20° F.

9. The fertilizer of claim 1 wherein:
   the metal ion is present in the fertilizer in a range of 0.01 weight % to 10 weight %, the weight % of the metal ion being based on percent by weight of the total fertilizer.

10. The fertilizer of claim 1 further comprising: borate ions, wherein the borate ions are present in the fertilizer in a range of 0.01 weight % to 10 weight %, the weight % of the borate ions being based on percent by weight of the total fertilizer.

11. The fertilizer of claim 1 wherein:
the aqueous composition includes urea and ammonium nitrate.

12. A method for fertilizing soil, the method comprising:
applying to the soil an amount of the fertilizer of claim 1, the amount being effective to improve plant growth.

13. A method for fertilizing soil, the method comprising:
adding the fertilizer of claim 1 to a urea-ammonium nitrate solution to create a second liquid fertilizer; and
applying to the soil an amount of the second fertilizer, the amount being effective to improve plant growth.

14. A liquid fertilizer comprising:
an aqueous composition including ammonium thiosulfate, the composition having a first freeze point;
a complex of a metal ion and a chelating agent, wherein the metal ion is selected from the group consisting of zinc, manganese, copper, iron, magnesium, calcium, potassium, and molybdenum; and
borate ions,
wherein the fertilizer has a second freeze point that is lower than the first freeze point of the aqueous composition, and
wherein the aqueous composition includes ammonium thiosulfate in a range of 55 weight % to 80 weight %, the weight % of the ammonium thiosulfate being based on percent by weight of the total aqueous composition, and
wherein the aqueous composition is present in the fertilizer in a range of 95 weight % to 99 weight %, the weight % of the aqueous composition being based on percent by weight of the total fertilizer, and
wherein the chelating agent is selected from aminocarboxylic acids, heterocyclic carboxylic acids, polycarboxylic acids, monocarboxylic acids, and mixtures and salts thereof, and
wherein the liquid fertilizer is stable,
wherein the liquid fertilizer does not include phosphites.

15. The fertilizer of claim 14 wherein:
the borate ions are present in the fertilizer in a range of 0.01 weight % to 5 weight %, the weight % of the borate ions being based on percent by weight of the total fertilizer, and
the metal ion is present in the fertilizer in a range of 0.01 weight % to 5 weight %, the weight % of the metal ion being based on percent by weight of the total fertilizer.

16. The fertilizer of claim 14 wherein:
the metal ion is selected from the group consisting of zinc, manganese, copper, iron, magnesium, and calcium, and
the chelating agent is ethylenediaminetetraacetic acid.

17. The fertilizer of claim 14 wherein:
the aqueous composition includes urea and ammonium nitrate.

18. A method for fertilizing soil, the method comprising:
applying to the soil an amount of the fertilizer of claim 14, the amount being effective to improve plant growth.

19. A method for fertilizing soil, the method comprising:
adding the fertilizer of claim 14 to a urea-ammonium nitrate solution to create a second liquid fertilizer; and
applying to the soil an amount of the second fertilizer, the amount being effective to improve plant growth.

20. The fertilizer of claim 14 wherein:
the borate ions are provided by a water soluble compound selected from the group consisting of boric acid, calcium metaborate, sodium metaborate, potassium metaborate, potassium tetraborate, sodium tetraborate, sodium metaborate tetrahydrate, disodium octaborate tetrahydrate, and sodium tetraborate decahydrate.

* * * * *

UNITED STATES PATENT AND TRADEMARK OFFICE
CERTIFICATE OF CORRECTION

PATENT NO. : 10,590,045 B2
APPLICATION NO. : 14/880369
DATED : March 17, 2020
INVENTOR(S) : Dean Blankenburg Page 1 of 1

It is certified that error appears in the above-identified patent and that said Letters Patent is hereby corrected as shown below:

In the Specification

Column 5, Line 25, "weight to" should be --weight % to--.

Column 5, Line 39, "weight to" should be --weight % to--.

Signed and Sealed this
Fifth Day of May, 2020

Andrei Iancu
*Director of the United States Patent and Trademark Office*